United States Patent Office
3,049,544
Patented Aug. 14, 1962

3,049,544
METHOD FOR THE PREPARATION OF 2,4-DI-AMINO-5-BENZYL PYRIMIDINES
Paul Stenbuck, Westchester, N.Y., and Harold Malcolm Hood, London, England, assignors to Burroughs Wellcome & Co. (U.S.A.) Inc., Tuckahoe, N.Y., a corporation of New York
No Drawing. Filed July 21, 1960, Ser. No. 44,250
Claims priority, application Great Britain Sept. 3, 1959
5 Claims. (Cl. 260—256.4)

This invention relates to a novel method for the preparation of 2,4-diamino-5-benzyl pyrimidines. This application is related to copending application of the same applicants, Serial No. 44,279, filed July 21, 1960.

Certain 2,4-diamino-5-benzyl pyrimidines have very marked antibacterial properties. Many of these have been described in U.S. Patents 2,658,897 and 2,909,522. Especially notable are 2,4-diamino-5-(3',4'-dimethoxybenzyl) pyrimidine; 2,4-diamino-5-(3',4'-dimethoxy-5'-bromobenzyl) pyrimidine, and 2,4-diamino-5-(3',4',5'-trimethoxybenzyl) pyrimidine.

The utilization of these compounds has been greatly limited by the expense of their preparation, which has been by the following sequence.

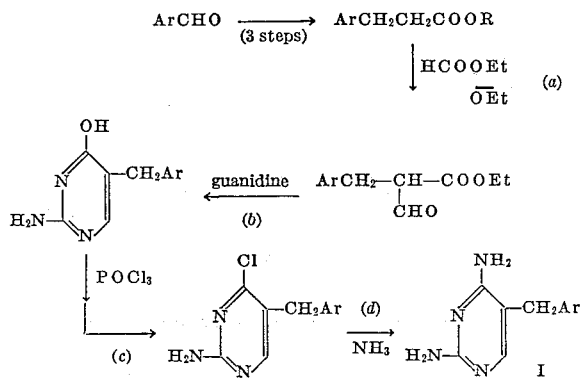

While in this sequence the first three steps are essentially quantitative, all of the last four are somewhat unsatisfactory. The multiplicity of steps together with multiplication of poor yields in the last four results in a cost for the final products that unfits them for many potential uses.

In our companion application, filed concurrently herewith, we have shown that aromatic aldehydes can be condensed with various β-substituted propionitriles to give mixtures of isomeric condensation products:

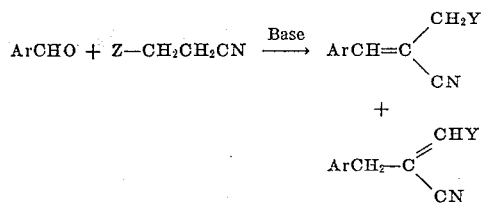

In the above reactions, Ar is an aryl radical; Z is an alkoxy, dialkylamino, or alkylthio radical, or a halogen atom; and Y is an alkoxy, dialkylamino, or alkylthio radical. Where, as is advantageously the case, the condensation takes place in a lower alcohol as solvent, Y is largely the alkoxyl radical corresponding to the solvent alcohol. When Z is RS or $R_2N$, this exchange is partial; when Z is halogen, it is complete. When Z is an alkoxyl different from the alkoxyl of the solvent alcohol, exchange is not demonstrably complete but is very extensive. Since, in the reaction that is the subject of the present invention, Y is eliminated, its identity within the limits specified is of little practical importance.

The isomers IIa and IIb are often difficult to separate. In cases where separation has been accomplished, we have found that substantially the same result is obtained with pure isomer IIa or with a crude mixture. The mechanism of the step about to be described is not entirely clear, but the reaction can be written in the sense:

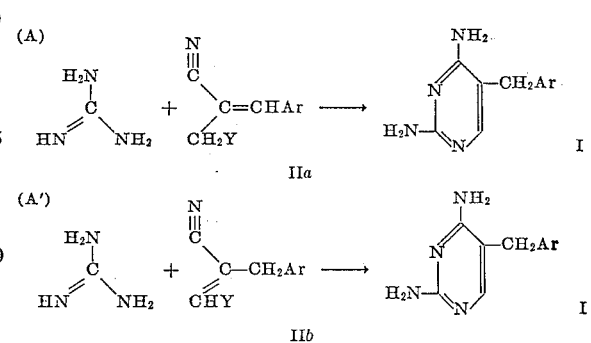

It is to be borne in mind that under alkaline conditions IIa and IIb are probably in tautomeric equilibrium with each other. It is consequently difficult to demonstrate whether the cyclization is due to the process A, or to A', or to both.

The yield in this cyclization varies somewhat according to the nature of Ar, being as high as 80% in some instances, and around 40–45% in others. Loss in these latter cases is apparently due to a concurrent polymerization which seems to be unavoidable since it involves groupings in Ar that are at times desirable.

It is also possible to conduct in one operation the initial condensation and the cyclization step. That is to say, guanidine base is added directly to the unpurified mixture of IIa and IIb and only the final product, I, is isolated. The yield in such a process is about what would be expected from the yields in the separate steps so that this method is esspecially advantageous in saving labor costs. In such an operation 2,4-diamino-5-(3',4'-dimethoxybenzyl) pyrimidine can be prepared in over 30% yield (from veratric aldehyde). The overall yield in the older procedure is 5–10%.

In this cyclizations, it is desirable to employ guanidine in excess of the amount theoretically necessary. We prefer to use excesses of 100–200%. Beyond 200% excess (3 eq. of guanidine) there is no further advantage. The reaction may be run in solution in any lower alcohol. However, there is a distinct advantage in using the alcohol having the same alkoxy radical as that, if any, present in Ar in a 2 or 4 position. For the compounds of particular interest it is therefore preferable to use methyl alcohol as solvent. This can be employed either at reflux or at slightly lower temperatures (e.g. at 56°) for a longer reaction-time. If the reaction mixture is refluxed, stirring is desirable to prevent bumping since many of the pyrimidine products crystallize out during the reaction. The concentration of the "benzal nitrile" (IIa or IIb) is advantageously 0.5–1 molar, the solution being 2–3 times as concentrated in guanidine.

Maintenance of an inert atmosphere, as by bubbling nitrogen through the reaction-mixture, does not improve the yield, although it does enable one to determine the amount of ammonia evolved. Some ammonia is apparently produced during the reaction—by side-reactions of unknown nature. The amount of this is so small that it is not believed to have any important influence on the practical aspects of the reaction.

EXAMPLE 1

14.25 g. guanidine hydrochloride dissolved in 25 ml. methanol was added to 8.1 g. sodium methoxide dissolved in 35 ml. methanol. The mixture was filtered and washed with 30 ml. methanol. The filtrate and washes were added to 12.35 g. β-ethoxy veratralnitrile and the solution was refluxed for five hours. The slurry was chilled in an icebath and the solid filtered off and washed with cold methanol. The filtrate and washes were reduced by boiling to 60 ml. and then refluxed for 18 hours. The slurry was chilled in an icebath, and the solid filtered off, washed with cold methanol and added to the first crop. The crude 2,4-diamino-5-(3,4-dimethoxybenzyl)pyrimidine was dissolved in 50 ml. 10% acetic acid, filtered, and reprecipitated by adding ammonia to bring the pH to 8.5. The reprecipitated pyrimidine was washed with water and then with 50% aqueous acetone, and dried at 100° to give 4.4 g. (34% yield).

EXAMPLE 2

3 g. sodium was dissolved in 150 ml. methanol, followed by 41.1 g. veratraldehyde and 25 g. β-ethoxypropiononitrile, and the mixture was refluxed for 3 hours on the steam bath. Then 94 ml. of a 47% w./v. solution of guanidine in methanol was added and the refluxing continued for 24 hours with stirring. The mixture was cooled and 22 g. yellow solid was filtered off. The mother liquors were concentrated to half volume and refluxed again for 24 hours and a further 5 g. solid was obtained. The combined crop was dissolved in dilute acetic acid, treated well with charcoal, and filtered. The filtrate was brought to pH 9 by the addition of ammonia solution and left to stand for 2 hours. The white product was filtered off, washed with water and acetone and dried to give 20 g. 2,4-diamino-5-(3,4-dimethoxybenzyl)pyrimidine, M.P. 228° C. (31% yield, reckoned on veratraldehyde).

EXAMPLE 3

20 mM (4.7 g.) β-methoxy veratralnitrile was dissolved in 30 ml. methanol containing in solution 60.6 mM guanidine (as shown by titration) and 1.6 mM ammonia. The solution was heated at 56° for 24 hours, while nitrogen gas was passed through the reaction mixture and then into standard perchloric acid where 6 mM ammonia collected. (The guanidine solution containing no veratralnitrile gave no more ammonia under these conditions than was originally present.) The volume of the reaction mixture after heating was about 25 ml. It was filtered hot, and the solid was washed with 25 ml. hot methanol to give 2.4 g. fairly pure 2,4-diamino-5-(3,4-dimethoxybenzyl)pyrimidine (44% yield). Similar experiments using 2.0 and 1.5 equivalents of guanidine gave yields of 40% and 37% respectively.

EXAMPLE 4

740 g. guanidine hydrochloride dissolved in 1500 ml. methanol was added to 420 g. sodium methoxide dissolved in 2700 ml. methanol. The mixture was filtered and washed with 450 ml. methanol. The filtrate and washes were added to 721 g. β-ethoxy 3,4,5-trimethoxybenzalnitrile and the solution was refluxed for two hours. After standing overnight at 3°, the mixture was seeded with 2,4-diamino-5-(3,4,5-trimethoxybenzyl)pyrimidine and yielded 120 g. crude product. The filtrate was concentrated by boiling off 1500 ml. at atmospheric pressure and then refluxed, having a total of four hours at boiling temperature. On standing overnight at 3° with added seed, a second crop of 100 g. crude product was obtained. The filtrate was further concentrated by boiling off another 1000 ml. and refluxed for a total of three hours. After two days at 3° a third crop of 55 g. crude product was recovered. 284 g. crude product was recrystallized from 2000 ml. hot 80% alcohol to give 214 g. 2,4-diamino-5-(3,4,5-trimethoxybenzyl)pyrimidine (28% yield) as pale yellow crystals, M.P. 195–197°.

EXAMPLE 5

285 g. guanidine hydrochloride dissolved in 650 ml. methanol was added with cooling to 162 g. sodium methoxide dissolved in 1000 ml. methanol. The filtrate from this mixture was added to 351 g. β-ethoxy-3-methoxy-4-n-butoxy-5-bromobenzalnitrile. The mixture was refluxed for 5 hours and then let stand at 2° for 2 days. A crop of 10 g. crystals was filtered off, and the mother liquor and washes were concentrated by boiling off 500 ml. methanol. The solution was cooled for one hour in an ice-acetone bath to give a second crop of 32 g. crystals. The mother liquor and washes were concentrated by boiling off 500 ml. methanol and chilled, but no solid appeared. The solution was diluted with 250 ml. methanol and refluxed for four hours. It was concentrated under reduced pressure to a thick syrup, and was then diluted with 750 ml. alcohol and chilled in an icebath giving a third crop of about 75 g. The mother liquor was concentrated under reduced pressure and poured into 2000 ml. ether. The supernatant was decanted, 1000 ml. ether was added together with filter-aid, and the combined ether solution was filtered through filter-aid. The filtrate was concentrated under reduced pressure to a thick syrup which was dissolved in alcohol and yielded a fourth crop of crystals on chilling. The four crops were combined, dissolved in 2800 ml. hot water containing 280 ml. acetic acid and treated with charcoal. The filtrate was chilled overnight at 2°, and the solid was filtered off, washed with water, and stirred with 700 ml. water bringing the pH to 11.0 with ammonia. The mixture was heated to 70°, and chilled to give 54 g. 2,4-diamino-5-(3-methoxy-4-n-butoxy-5-bromobenzyl)pyrimidine, M.P. 178–180°.

EXAMPLE 6

57 g. guanidine hydrochloride dissolved in 120 ml. methanol was added to 32 g. sodium methoxide dissolved in 200 ml. methanol. The filtrate and 40 ml. methanol used for washings were added to 44 g. β-ethoxy 4-chlorobenzalnitrile. The mixture was refluxed for 2.5 hours and then chilled in an icebath for an hour. The precipitate was filtered and washed with methanol. The filtrate and washes were boiled at atmospheric pressure to 250 ml. total volume and then refluxed for a total of 2 hours. The solution was chilled to give a second crop of crystals. The filtrate and washings were concentrated under reduced pressure to a thick syrup which was diluted with alcohol. A third crop precipitated, and a fourth crop was obtained from the filtrate after standing overnight at 2°. The four crops were combined, slurried and washed with ice-cold alcohol to remove much color, and dissolved in 175 ml. warm 10% acetic acid. After charcoal treatment, the light green solution yielded on chilling crystals of 2,4-diamino-5-(4-chlorobenzyl)-pyrimidine acetate which contained most of the color. The acetate salt was slurried in water at 60° and brought to pH 8.0 with ammonia. After chilling, the solid was filtered off and slurried in acetone to remove much color and giving 9 g. 2,4-diamino-5-(4-chlorobenzyl)-pyrimidine, M.P. 215–217°. The acetone was concentrated to a sludge which was redissolved in a minimum of boiling acetone to give 1.0 g. crystals, M.P. 218–220°. The total yield was thus 10 g. (21%).

EXAMPLE 7

20 mM (4.4 g.) β-methoxy piperonalnitrile was added to 40 ml. methanol containing 60 mM dissolved guanidine. The reaction mixture was warmed to 50° while 20 ml. methanol was removed in vacuo. The mixture was heated at 50° for 26 hours. The contents were filtered hot and washed with hot methanol to give 2.8 g. of a yellow solid, M.P. 231° after darkening. It was dissolved in 50 ml. 5% acetic acid and the solution brought to pH 5 with added dilute aqueous sodium hydroxide. Much yellow material precipitated and was removed. The filtrate was treated with charcoal, filtered, and brought to pH 10. A cream-colored solid separated. This process was repeated to give 1.8 g. 2,4-diamino-5-(3,4-methylenedioxybenzyl)pyrimidine, M.P. 238°, still not pure. This solid was slurried with 5% aqueous potassium hydroxide, filtered, washed free of alkali and recrystallized from 80% ethanol. Well-formed, very pale yellow prisms separated having the correct composition for the desired pyrimidine.

EXAMPLE 8

10 g. of β-ethoxy benzalnitrile was refluxed with 60 ml. of an 18.4% w./v. solution of guanidine in methanol. After 48 hours the mixture was concentrated to half its original volume and refluxed for a further 48 hours. The solid was filtered off after cooling, washed with aqueous acetone and dried to give 3 g. 2,4-diamino-5-benzyl-pyrimidine melting point 196° (28% yield).

EXAMPLE 9

The condensation products from reactions of veratric aldehyde with β-bromopropionitrile, β-dimethylaminopropionitrile, and β-propylthiopropionitrile of our copending application were reacted with guanidine by the method of Example 1. From each of the reactions, 2,4-diamino-5-(3',4'-dimethoxy-benzyl) pyrimidine was obtained in approximately the yield given in Example 1.

EXAMPLE 10

The condensation products of 3-methoxy-4-n-butoxy-benzaldehyde and 2-methoxy-3,5-dichlorobenzaldehyde were cyclized with guanidine by the method of Example 5 giving 2,4-diamino-4-(3'-methoxy-4'-butoxy-benzyl)pyrimidine (M.P., 135°) and 2,4-diamino-4-(3'-methoxy-3'-5'-dichlorobenzyl)pyrimidine (M.P., 300°).

EXAMPLE 11

2,4-Diamino-4-(α-Naphthylmethyl) Pyrimidine

A guanidine solution was prepared by dissolving 3.5 g. of sodium in 50 cc. of methanol and 15 g. (0.15 mole) of guanidine hydrochloride in 25 cc. of methanol, mixing the solutions, and filtering off the precipitated sodium chloride. To the solution (volume now 100 cc.) was added 12 g. (0.05 mole) of the distilled but unseparated condensation product from α-naphthaldehyde and β-methoxypropionitrile. The solution was heated to boiling with stirring, boiled until the volume had diminished to 75 cc., and then refluxed for 23 hours. The color, initially a pale yellow, did not increase during this time. Three and a half hours after boiling began a precipitate appeared, and reaction may well have been substantially complete, shortly thereafter. The reaction-mixture was filtered hot, and the precipitate was washed with methanol. This crop of the product weighed 9.8 g., and 0.4 g. more was obtained from the mother liquors on cooling. This material melted at 232-3° as obtained and at 232.5–233.5° after recrystallization from 80% alcohol. Its composition was correct for 2,4-diamino-5-(α-naphthyl methyl) pyrimidine. At pH 1 it showed the following absorption:

|  | λ max., mμ | e max. | λ min., mμ | e min. |
| --- | --- | --- | --- | --- |
| pH 11 | 273 | 11,500 | 252 | 6,900 |
|  | 281 | 11,750 |  |  |
|  | 284 | 13,150 | 253 | 5,000 |

It forms a hydrochloride which is very sparingly soluble in water.

EXAMPLE 12

2,4-Diamino-5-(m-Ethoxybenzyl) Pyrimidine

Eleven g. of a distilled mixture of isomers from the condensation of m-ethoxybenzaldehyde with β-ethoxypropionitrile was reacted with a guanidine solution prepared as in the previous example. In this case the reflux period was 48 hours (a shorter time gave an inferior yield). On cooling a solid separated. This was filtered off and washed successively with methanol, water, acetone, and ether. It weighed 8.3 g. and melted at 166–167.5°. A further crop of 0.7 g. was obtained from the mother liquors. It was recrystallized for analysis from methanol and then melted at 166.5–167.5°. It had the correct composition for 2,4-diamino-5-(m-ethoxybenzyl) pyrimidine.

EXAMPLE 13

By the same procedure as described in Example 11, guanidine was reacted with the condensation products from 3-methoxy-4-octyloxy benzaldehyde and 3-methoxy-4-sec butoxy benzaldehyde. There were obtained 2,4-diamino-5-(3'-methoxy-4'-octyloxybenzyl) pyrimidine, M.P., 149.5–150°, and 2,4-diamino-5-(3'-methoxy-4'-sec butoxy-benzyl) pyrimidine, M.P., 178.5–179°.

In the above examples, the melting points are in the centigrade scale and are uncorrected.

What we claim is:

1. The method of preparing 2,4-diamino-5-benzyl pyrimidines which comprises condensing an aromatic aldehyde with a β-lower alkoxy propionitrile in the presence of a basic catalyst to give a mixture of β-alkoxy-α-arylylidene propionitrile and its tautomers and reacting this mixture with guanidine base.

2. The method of preparing a compound of the formula

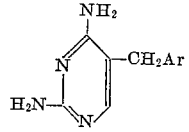

wherein Ar is a phenyl group comprising reacting a mixture of isomers having the formulae

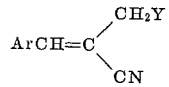

and

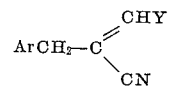

wherein Y is selected from the class consisting of alkoxy, dialkylamino and alkylthio with guanidine under alkaline conditions and recovering the product.

3. The method as set forth in claim 2 wherein guanidine is employed in excess of the theoretical amount.

4. The method as set forth in claim 2 wherein guanidine is employed in excess in an amount of from 100 to 200 percent.

5. The method as set forth in claim 2 wherein the reaction mixture is refluxed for about 18 hours.

References Cited in the file of this patent

UNITED STATES PATENTS

| 2,602,794 | Hitchings et al. | July 8, 1952 |
| 2,658,897 | Hitchings et al. | Nov. 10, 1953 |
| 2,909,522 | Hitchings et al. | Oct. 20, 1959 |

OTHER REFERENCES

MacArdle, "Use of Solvents," pages 40–45 (1925).